March 8, 1955  H. M. SEUBERT, JR  2,703,562
PISTON OPERATED PNEUMATIC FUEL INJECTOR
Filed March 5, 1953  3 Sheets-Sheet 1

Harry M. Seubert, Jr.
INVENTOR.

March 8, 1955 H. M. SEUBERT, JR 2,703,562
PISTON OPERATED PNEUMATIC FUEL INJECTOR
Filed March 5, 1953 3 Sheets-Sheet 2

Harry M. Seubert, Jr.
INVENTOR.

BY
Attorneys

March 8, 1955  H. M. SEUBERT, JR  2,703,562
PISTON OPERATED PNEUMATIC FUEL INJECTOR
Filed March 5, 1953  3 Sheets-Sheet 3
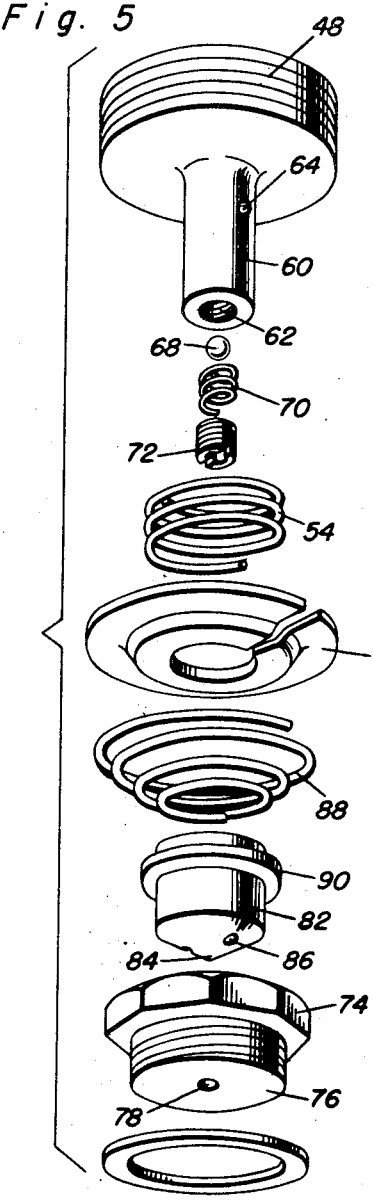
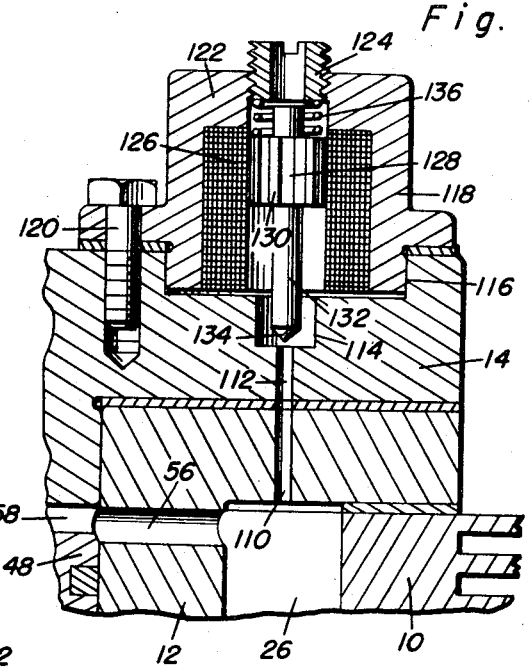
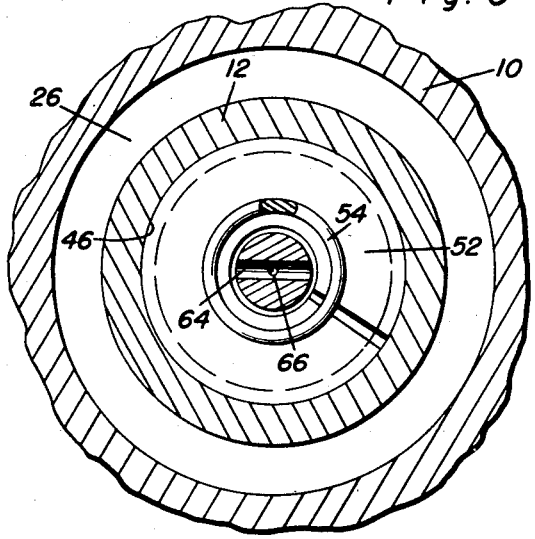
Harry M. Seubert, Jr.
INVENTOR.

United States Patent Office 2,703,562
Patented Mar. 8, 1955

2,703,562

PISTON OPERATED PNEUMATIC FUEL INJECTOR

Harry M. Seubert, Jr., Fort Wayne, Ind.

Application March 5, 1953, Serial No. 340,643

9 Claims. (Cl. 123—139)

This invention comprises novel and useful improvements in a piston operated pneumatic fuel injector and more specifically pertains to an injection device for injecting solid fuel into the combustion chamber of an internal combustion engine, preferably of the two cycle type, wherein the time and quantity of fuel injection may be accurately regulated; and wherein the injector is operated by the piston of the engine by a pneumatic operating means which will eliminate the positive mechanical connection usually provided between a piston and the fuel injector.

The primary object of this invention is to provide a fuel injector for internal combustion engines which shall have an improved manner of supplying liquid fuel to the injector.

A further object of the invention is to provide a fuel injector in conformity with the preceding object which shall admit of accurate and precise regulation of the time and the quantity of fuel injection into the combustion chamber of the engine.

Yet another object of the invention is to provide a fuel injector in accordance with the foregoing objects wherein the injector shall be actuated in variably timed relation by and with respect to the travel of the piston of the internal combustion engine without the necessity for interposing a mechanical operating connection therebetween.

A still further object of the invention is to provide a fuel injector and operating mechanism in conformity with the foregoing objects wherein a pneumatic column is associated with the piston of the internal combustion engine and fuel injector for the same in an improved manner for operating the latter by the former; and wherein variation in the timing and in the quantity of the fuel injection may be obtained by varying the pressure to which the pneumatic column is subjected.

A further object of the invention is to provide an operating means connecting operatively the piston of an internal combustion engine with the fuel injector for the combustion chamber of the same which will entirely eliminate any direct and positive connection between the piston and injector.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a horizontal sectional view taken substantially upon the plane indicated by the section line 3—3 of Figure 1;

Figure 4 is a detail view of a portion of the upper right hand part of Figure 1, showing upon an enlarged scale a solenoid operated pressure release valve for varying the timing and quantity of the fuel injection; and Figure 5 is an exploded prospective view showing the various elements of the fuel injector assembly.

Figure 1:
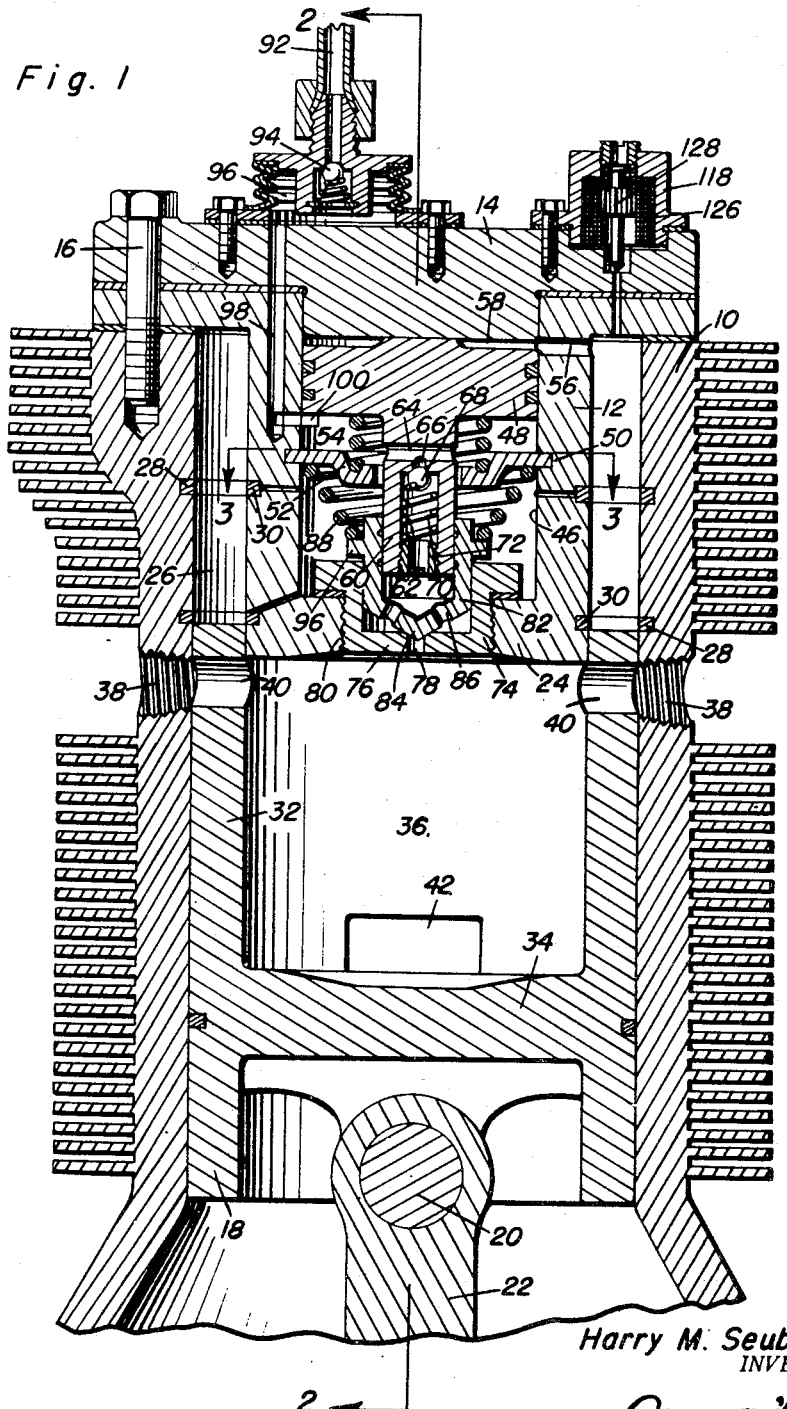
Figure 1 is a vertical central sectional view through a portion of a cylinder of an internal combustion engine showing one embodiment incorporating therein the principles of this invention, the piston being shown at the bottom of its power and exhaust stroke preparatory to its compression and injection stroke.

It is a fundamental purpose of this invention to provide an improved internal combustion engine of the fuel injection type and especially of the two cycle type, wherein the ordinary positive mechanical connection between the piston of the cylinder and the fuel injector may be obviated, thereby permitting the use of the novel fuel injector in engines of the free piston type, while still permitting timing and operation of the fuel injector with provision for varying both the time and the quantity of fuel injection. This object of the invention is obtained in the embodiment illustrated in the drawings and wherein an air cooled cylinder 10 is depicted having a re-entrant cylinder head 12 with a closure cap 14, the head and cap being retained upon the top of the cylinder as by fastening bolts 16. Slidably received within the cylinder 10 is an engine piston 18 which is connected by a piston pin 20 to a conventional connecting rod 22 operated in any desired manner. Where the piston is of the free floating type, the wrist pin and connector rod 22 will of course be omitted.

The re-entrant cylinder head 12 is provided with a bottom wall 24 which forms the top wall of the combustion chamber of the cylinder. An annular space 26 is provided between the sides of the re-entrant head and the sides of the cylinder and this space constitutes an air compression chamber as set forth hereinafter. Disposed in this compression chamber are sets of piston ring 28 and 30 and an annular piston 32 is slidably received within the compression chamber 26, this compression piston being either integrally carried by the piston 18 o rigidly attached thereto, in the form of an upstanding skirt as shown.

The space between the bottom wall 24 of the re-entran head 12, the top wall 34 of the piston 18, and within the annular piston 32 constitutes the combustion chamber 36 of the engine.

Uniflow scavenging and exhaust of the combustion chamber is attained by the provision of upper air inlet ports 38 formed in the walls of the cylinder 10 and whicl register with upper inlet ports 40 extending througl the upper portion of the compression piston 32, together with lower exhaust ports 42 the lower portion of the piston which upon the bottom stroke of the piston are adapted to register with exhaust passages or ports 44 formed in the lower portion of the cylinder 10. It will thus be apparent that upon the out stroke of the piston when the cylinder exhaust ports 44 register with the piston exhaust ports 42 just prior to the registration of the upper sets of inlet ports of the piston and cylinder, the working pressure will be relieved and upon further downward movement of the piston such registration will be maintained as the inlet ports are caused to register at 38 and 40 as shown in Figure 1, whereby scavenging air either from the atmosphere or from any suitable source of air under pressure will flow downwardly through the combustion chamber scavenging the same of the products of combustion therein.

It will also be apparent that upon the upward stroke of the piston assembly, that the compression piston 32 moving upwardly in the air compression chamber 26 will compress air therein, this compressed air being utilized as a source of pressure for actuating and for timing the actuation of the fuel injector assembly.

The fuel injector assembly is mounted and housed entirely within the re-entrant cylinder head 12. For this purpose, the re-entrant cylinder head is provided with a cylindrical bore 46 within the upper part of which is slidably received a piston 48. Disposed in an annular groove 50 at about the midportion of the cylinder 46 is a split ring 52 which constitutes a seat for a compression spring 54 which rests upon this ring and engages the bottom of the piston 48 to yieldingly urge the latter upwardly within the cylinder 46. The piston 48 constitutes the operated piston, being urged downwardly against the return spring 54 by means of the air compressed in the compression chamber 26, this compressed air being communicated with the top side of the piston 48 by means of a passage 56 extending through the side of the re-entrant head. This passage communicates with an operating chamber 58 disposed within the cylinder 12 above the piston 48.

Carried by the operated piston 48 and depending centrally therefrom is the operating piston 60 of the fuel injector, which is provided with a cylindrical bore 62 opening from the bottom end of the same. A transverse passage 64 disposed in the operating piston communicates with the interior of the cylinder 46, and also with the interior of the central cylindrical bore 62 by means of a passage 66 under the control of a non-return ball valve 68 which is yieldingly urged upwardly against its seat by a compression spring 70 which is retained within the cylindrical bore 62 by means of a screw threaded bushing 72.

The injector further includes an externally threaded gland 74 having a bottom wall 76 which is centrally apertured as at 78, this gland being externally threaded to engage the internally threaded centrally disposed bore 80 in the bottom wall 24 of the re-entrant head.

Slidable within the gland 74 is an injector valve 82 having a conical valve 84 on its lower extremity adapted to engage a valve seat of the bore 78. Discharge orifices 86 extend through the bottom wall of the valve sleeve 82 and the interior of this sleeve slidably receives the external surface of the injector operating piston 60. A compression spring 88 has its lower end engaged upon an external flange 90 of the valve sleeve 82, its upper end bears against the underside of the retainer plate 52 previously mentioned. The spring yieldingly urges the valve member 82 into its lower or closed position as shown in Figure 1, at which time the valve portion 84 closes the passage 78 preventing the flow of fuel from the pumping chamber of the fuel injector, this pumping chamber consisting of the cylindrical chamber 62 within the operating piston 60, and the chamber within the valve sleeve 82.

Fuel is supplied to the fuel injector from any suitable source as by means of a conduit 92 and a non-return ball check valve 94, from whence the fuel collects in a diaphragm or bellows 96 and is conducted by means of passages 98 and a port 100 into the cylinder 46 below the piston 48 and above the spring retainer 52. The space below the piston 48 in the cylinder 46 thus constitutes a reservoir which is at all times in communication with the passage 64 in the operating piston 60. However, the port 100 is controlled by the piston 48, so that when the latter is moved upon its downward stroke it will cut off communication of the fuel reservoir with the fuel passage system 98.

The operation of the apparatus as so far described is as follows:

When the parts in the position shown in Figure 1, the engine cycle of operation has just completed its power and exhaust stroke, and the combustion chamber 36 is now filled with fresh air, and the parts of combustion have been scavenged and exhausted therefrom. At the same time, the injector operated piston 48 has moved to the upper end of its chamber under the impetus of the spring 54, while the injector valve 82 has been seated by the spring 88, the fuel injecting chamber has been expanded to its maximum extent and is now filled with fuel through the registering passages, as the piston 48 has uncovered the inlet port 100 of the fuel supplying system.

Figure 2:
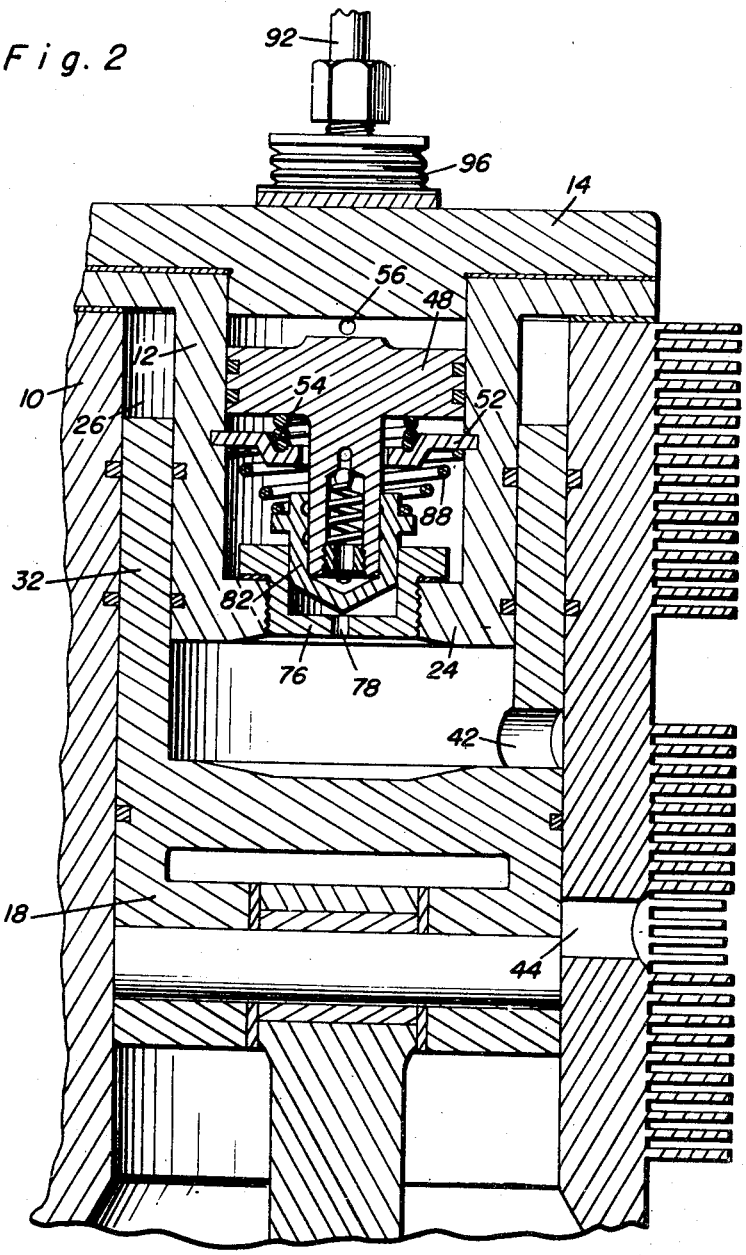
Figure 2 is a fragmentary vertical sectional view similar to Figure 1 but showing the parts in a different position, with the piston of the internal combustion engine adjacent the top of its compression stroke, and showing the fuel injector at the end of its injection stroke, the view of Figure 2 being taken at right angles to the view of Figure 1.

As the piston 18 now moves upwardly, the intake and exhaust ports of the combustion chamber are closed and the compression piston 32 moving into the compression chamber 26 begins to compress the air therein. When the compressed air in the compression chamber reaches a sufficient degree of compression, this pressure communicated by the passage 56 to the chamber 58 above the operated piston 48 begins to move the latter downwardly upon its injection stroke. This downward movement first closes the port 100 thereby cutting off communication of the reservoir with the source of supply. Further downward movement now applies pressure to the fuel in the reservoir and since the latter is in continuous communication with the passage 64, also applied pressure through the passage 66 and the non-return valve 68 to the fuel within the injection chamber. When the pressure in the latter reaches a predetermined value for which the apparatus is calibrated, this pressure acting upon the greater area of the conical bottom wall of the injector valve sleeve 82 will lift the latter against the spring 88, the position of the parts being as indicated in Figure 2. As the valve 84 is raised from the seat on the port 78, the fuel within the injection chamber is now discharged by way of the passages 86 and 87 into the combustion chamber 36. It will be obvious that the entire operation of injection is effected by the pressure brought to the compression chamber 26 by the upward movement of the piston; and therefore is in timed relation to the position of the piston 18. This timed relation can be varied in order to change the time of injection and also to vary the quantity of injection. A convenient means for doing this has been illustrated in the drawings and consists of a mechanism whereby the pressure developed within the chamber 26 can be varied both as to its maximum pressure and as to the time at which sufficient pressure is attained to actuate the injector.

For this purpose there is provided a pressure relief valve assembly whose construction is more clearly shown in Figure 4. This includes aligned vent passages 110 and 112 formed respectively in the re-entrant head 12 and in the cylinder head cover plate 14. These passages communicate with a diametrically enlarged bore 114 disposed in the top surface of the cap 14 and opening in turn into a diametrically enlarged recess 116 in the top wall of the cap. A valve body 118 is secured to the cap 14 as by fastening bolts 120, and has its open lower ends seated in the recess 116, its upper end being provided with a top wall 122 which is centrally apertured to receive an externally threaded sleeve 124. Disposed within the valve body 118 is a solenoid winding or coil 126 which is connected in any suitable manner, not shown, to a suitable source of electric power whereby the solenoid winding may be energized. Slidable within the winding is the solenoid armature 128 whose exterior surface is provided with longitudinally extending channels or flutes 130 permitting the passage of air past the solenoid armature.

Carried by and depending axially and centrally from the armature is a valve stem 132 having a valve 134 at its lower end which is adapted to seat upon and control the upper end of the passage 112. A compression spring 136 is disposed between the sleeve 124 and the upper side of the armature 128 for yieldingly urging the armature downwardly into valve closing position. Energization of the solenoid will however lift the armature and thereby open the valve.

It will be evident that when the solenoid is actuated, that air will be permitted to escape from the compression chamber 26 through the passages 110, 112, past the valve 134, and by way of the channels or flutes 130 and the sleeve 124 to the atmosphere. Thus, this solenoid valve provides a means for venting or reducing the pressure within the air compression chamber 26 whereby the time at which sufficient pressure therein has been produced to actuate the injector operated piston 48, can be readily controlled and regulated.

Where desired, the electrical circuit of the solenoid winding 126 can be controlled by a speed governor associated with any convenient portion of the engine in order to vary the effective working pressure developed within the combustion chamber of the engine. It is of course possible to operate the solenoid manually rather than by a speed governor; or to provide other vent means for regulating the maximum pressure and the time in which the maximum pressure occurs within the air compression chamber.

It is also evident that in place of the operating and operated pistons, the fuel injector may use the equivalent structures of diaphragms.

What is claimed as new is as follows:

1. A two cycle internal combustion engine of the fuel injection type including a cylinder and a re-entrant cylinder head therein defining an annular air compression chamber between the head and cylinder, a working piston slidable in said cylinder, a compression piston on said working piston and slidable in said compression chamber, said cylinder having a working chamber between said head and said working piston, a fuel injector in said head discharging into said working chamber, means for supplying fuel to said fuel injector, means responsive to pressure in said compression chamber for operating said fuel injector.

2. A two cycle internal combustion engine of the fuel injection type including a cylinder and a re-entrant cylinder head therein defining an annular air compression chamber between the head and cylinder, a working piston slidable in said cylinder, a compression piston on said working piston and slidable in said compression chamber, said cylinder having a working chamber between said head and said working piston, a fuel injector in said head discharging into said working chamber, means for supplying fuel to said fuel injector, means responsive to pressure in said compression chamber for operating said fuel injector, means for varying the pressure in said compression chamber.

3. A two cycle internal combustion engine of the fuel injection type including a cylinder and a re-entrant cylinder head therein defining an annular air compression chamber between the head and cylinder, a working piston slidable in said cylinder, a compression piston on said working piston and slidable in said compression chamber, said cylinder having a working chamber between said head and said working piston, a fuel injector in said head discharging into said working chamber, means for supplying fuel to said fuel injector, means responsive to pressure in said compression chamber for operating said fuel injector, means for varying the time of operation and the extent of operation of said fuel injector by said pressure responsive means.

4. A two cycle internal combustion engine of the fuel injection type including a cylinder and a re-entrant cylinder head therein defining an annular air compression chamber between the head and cylinder, a working piston slidable in said cylinder, a compression piston on said working piston and slidable in said compression chamber, said cylinder having a working chamber between said head and said working piston, a fuel injector in said head discharging into said working chamber, means for supplying fuel to said fuel injector, means responsive to pressure in said compression chamber for operating said fuel injector, said fuel injector including an operated piston and an operating piston, cylinders slidably receiving said operated and operating pistons, said pressure responsive means including a passage communicating with said operated piston.

5. A two cycle internal combustion engine of the fuel injection type including a cylinder and a re-entrant cylinder head therein defining an annular air compression chamber between the head and cylinder, a working piston slidable in said cylinder, a compression piston on said working piston and slidable in said compression chamber, said cylinder having a working chamber between said head and said working piston, a fuel injector in said head discharging into said working chamber, means for supplying fuel to said fuel injector, means responsive to pressure in said compression chamber for operating said fuel injector, said fuel injector including an operated piston and an operating piston, cylinders slidably receiving said operated and operating pistons, said pressure responsive means including a passage communicating with said operated piston, said fuel supplying means having a port communicating with the cylinder of said operated piston, said port being controlled by said operated piston.

6. The combination of claim 2 wherein said pressure varying means comprises a vent for releasing pressure from said compression chamber, means controlling the escape of pressure through said vent.

7. The combination of claim 1 wherein said compression piston comprises a cylindrical rim on said working piston and is slidably received in said annular air compression chamber.

8. The combination of claim 2 wherein said pressure varying means comprises a vent for releasing pressure from said compression chamber, means controlling the escape of pressure through said vent, said re-entrant cylinder head having a mounting flange for securing the same to said cylinder, said vent extending through said mounting flange.

9. The combination of claim 2 wherein said pressure varying means comprises a vent for releasing pressure from said compression chamber, means controlling the escape of pressure through said vent, said re-entrant cylinder head having a mounting flange for securing the same to said cylinder, said vent extending through said mounting flange, and said control means being secured to the exterior of said flange.

References Cited in the file of this patent

UNITED STATES PATENTS

| | | |
|---|---|---|
| 1,856,852 | Palisca | May 3, 1932 |
| 1,972,881 | Geisse | Sept. 11, 1934 |
| 2,067,997 | White | Jan. 19, 1937 |

FOREIGN PATENTS

| | | |
|---|---|---|
| 187,950 | Great Britain | Nov. 29, 1923 |
| 604,343 | Great Britain | July 1, 1948 |
| 626,994 | Great Britain | July 25, 1949 |